United States Patent
Kivioja

(10) Patent No.: US 12,453,317 B2
(45) Date of Patent: *Oct. 28, 2025

(54) APPARATUS FOR CONTROLLING CONDITIONS IN A PLANT CULTIVATION FACILITY

(71) Applicant: NETLED TECHNOLOGY OY, Tampere (FI)

(72) Inventor: Niko-Matti Kivioja, Siivikkala (FI)

(73) Assignee: NETLED TECHNOLOGY OY, Tampere (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,298

(22) Filed: Feb. 15, 2023

(65) Prior Publication Data

US 2023/0189721 A1    Jun. 22, 2023

Related U.S. Application Data

(63) Continuation-in-part of application No. 16/309,232, filed as application No. PCT/FI2017/050424 on Jun. 8, 2017, now Pat. No. 11,602,104.

(30) Foreign Application Priority Data

Jun. 13, 2016  (FI) ...................................... 20165491

(51) Int. Cl.
*A01G 9/24*  (2006.01)
*F21V 29/50*  (2015.01)

(52) U.S. Cl.
CPC .............. *A01G 9/249* (2019.05); *F21V 29/50* (2015.01)

(58) Field of Classification Search
CPC ... A01G 9/00; A01G 9/14; A01G 9/24; A01G 9/246; A01G 9/247; A01G 9/249
See application file for complete search history.

(56) References Cited

U.S. PATENT DOCUMENTS 5,014,770 A * 5/1991 Palmer .................. F24F 5/0046
                                                                165/48.2
5,261,251 A * 11/1993 Galiyano ............... G05D 23/19
                                                                62/238.7
(Continued)

FOREIGN PATENT DOCUMENTS

DE    202014105523 U1    2/2016
EP         1933602 A1    6/2008
(Continued)

OTHER PUBLICATIONS

International Search Report and Written Opinion mailed Sep. 8, 2017 in corresponding international application No. PCT/FI2017/050424 (12 pages).

*Primary Examiner* — Claude J Brown
(74) *Attorney, Agent, or Firm* — Jeffri A. Kaminski; Venable LLP

(57) ABSTRACT

An apparatus for controlling conditions in a plant cultivation facility includes a lighting system arranged in connection with plants present in a cultivation facility. A hydronic cooling arrangement lowers or impedes the rise of temperature in the cultivation facility. The cooling arrangement has a cooling manifold present in connection with plants in the cultivation facility and a heat recovery arrangement for utilizing excess heat generated in the cultivation facility. The heat recovery arrangement includes a heat storing system. The heat recovery arrangement includes condenser dryers/coolers for collecting water and/or heat absorbed in the indoor air of a cultivation facility and a heat pump assembly for transferring the heat accumulated in the heat storing system into a secondary circuit independent, with respect to cooling arrangement's water circulation loops.

5 Claims, 8 Drawing Sheets

(56) References Cited

U.S. PATENT DOCUMENTS

Figure 1:
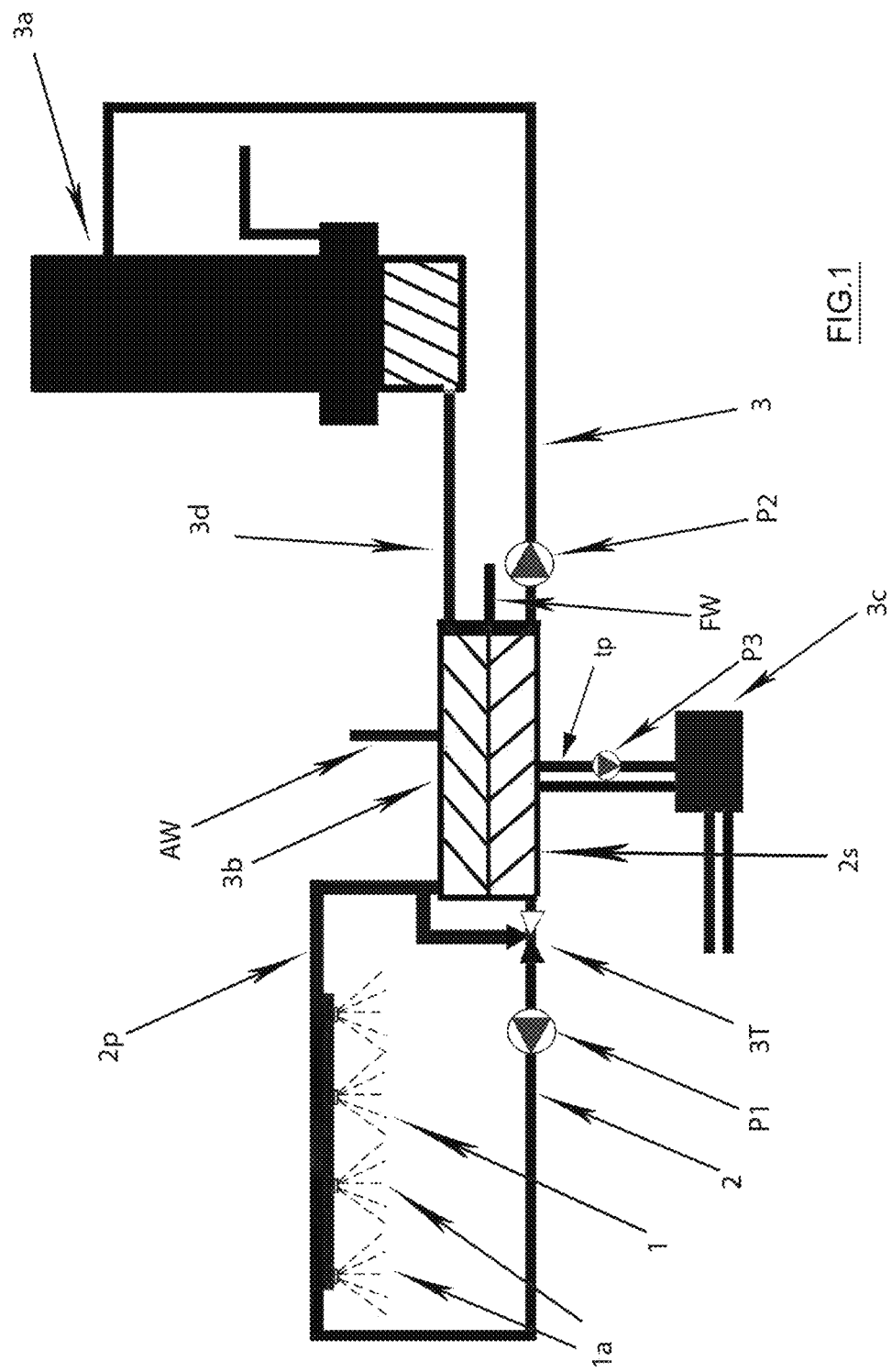

| | | | |
|---|---|---|---|
| 7,441,915 B2 | 10/2008 | Shouse et al. | |
| 8,651,704 B1 * | 2/2014 | Gordin | F21V 29/60 |
| | | | 362/373 |
| 9,480,207 B2 * | 11/2016 | Tanase | F21V 29/00 |
| 9,523,489 B1 | 12/2016 | Harms | |
| 10,113,343 B2 | 10/2018 | Keen et al. | |
| 10,342,190 B2 | 7/2019 | Miyabe et al. | |
| 10,856,470 B2 | 12/2020 | Lys et al. | |
| 10,999,976 B2 * | 5/2021 | Lys | F21V 15/01 |
| 11,022,291 B1 * | 6/2021 | King | A01G 9/246 |
| 11,076,536 B2 * | 8/2021 | Lys | F21V 23/045 |
| 11,602,104 B2 * | 3/2023 | Kivioja | A01G 9/249 |
| 2007/0163170 A1 | 7/2007 | Brault et al. | |
| 2008/0049417 A1 | 2/2008 | Shouse et al. | |
| 2008/0191236 A1 | 8/2008 | De Graaf et al. | |
| 2008/0212332 A1 | 9/2008 | Medinis | |
| 2009/0027888 A1 * | 1/2009 | Yu | F21V 29/76 |
| | | | 362/373 |
| 2009/0308586 A1 | 12/2009 | Juslen | |
| 2011/0037369 A1 | 2/2011 | Van Elmpt | |
| 2011/0183368 A1 | 7/2011 | Chapman et al. | |
| 2012/0111954 A1 | 5/2012 | Kim et al. | |
| 2013/0000185 A1 * | 1/2013 | Tanase | A01G 9/249 |
| | | | 362/249.02 |
| 2013/0003382 A1 | 1/2013 | Ohura et al. | |
| 2014/0020676 A1 * | 1/2014 | Wehner | F24S 50/40 |
| | | | 236/12.11 |
| 2015/0168020 A1 * | 6/2015 | Wehner | F24S 40/55 |
| | | | 126/714 |
| 2016/0007546 A1 | 1/2016 | van Wolferen et al. | |
| 2016/0109107 A1 | 4/2016 | Grajcar | |
| 2018/0168111 A1 | 6/2018 | Yasukuri | |
| 2018/0249644 A1 | 9/2018 | Kivioja | |
| 2018/0347841 A1 | 12/2018 | Wallace | |
| 2019/0116739 A1 | 4/2019 | Lys et al. | |
| 2019/0246572 A1 * | 8/2019 | Kivioja | A01G 9/246 |
| 2020/0236870 A1 | 7/2020 | Lys et al. | |

FOREIGN PATENT DOCUMENTS

| | | | | |
|---|---|---|---|---|
| EP | 2374348 A1 | 10/2011 | | |
| FR | 2374594 A1 | 7/1978 | | |
| KR | 20140147385 A | 12/2014 | | |
| WO | 2007101914 A1 | 9/2007 | | |
| WO | WO-2017037332 A1 * | 3/2017 | | A01G 7/045 |

* cited by examiner

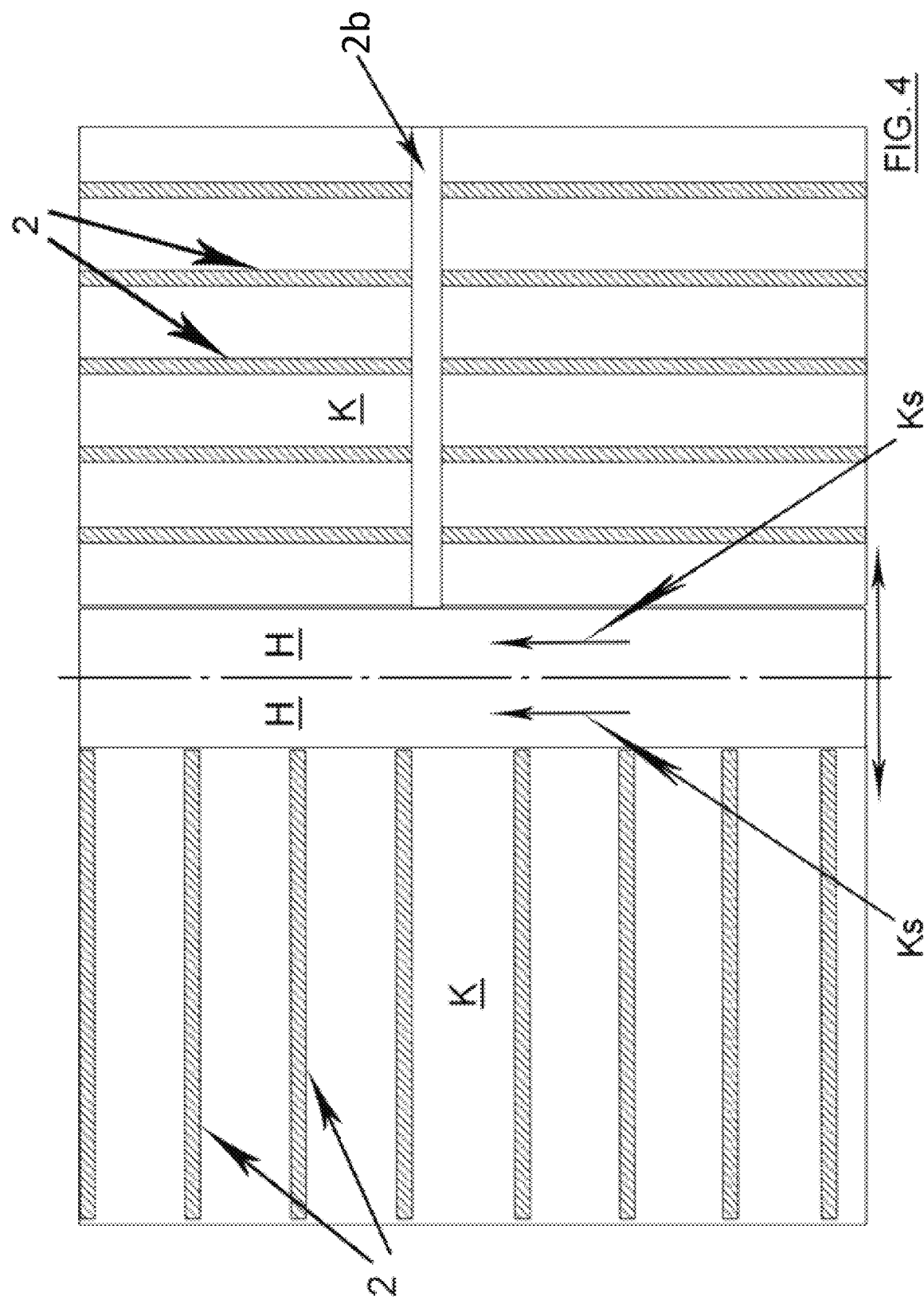

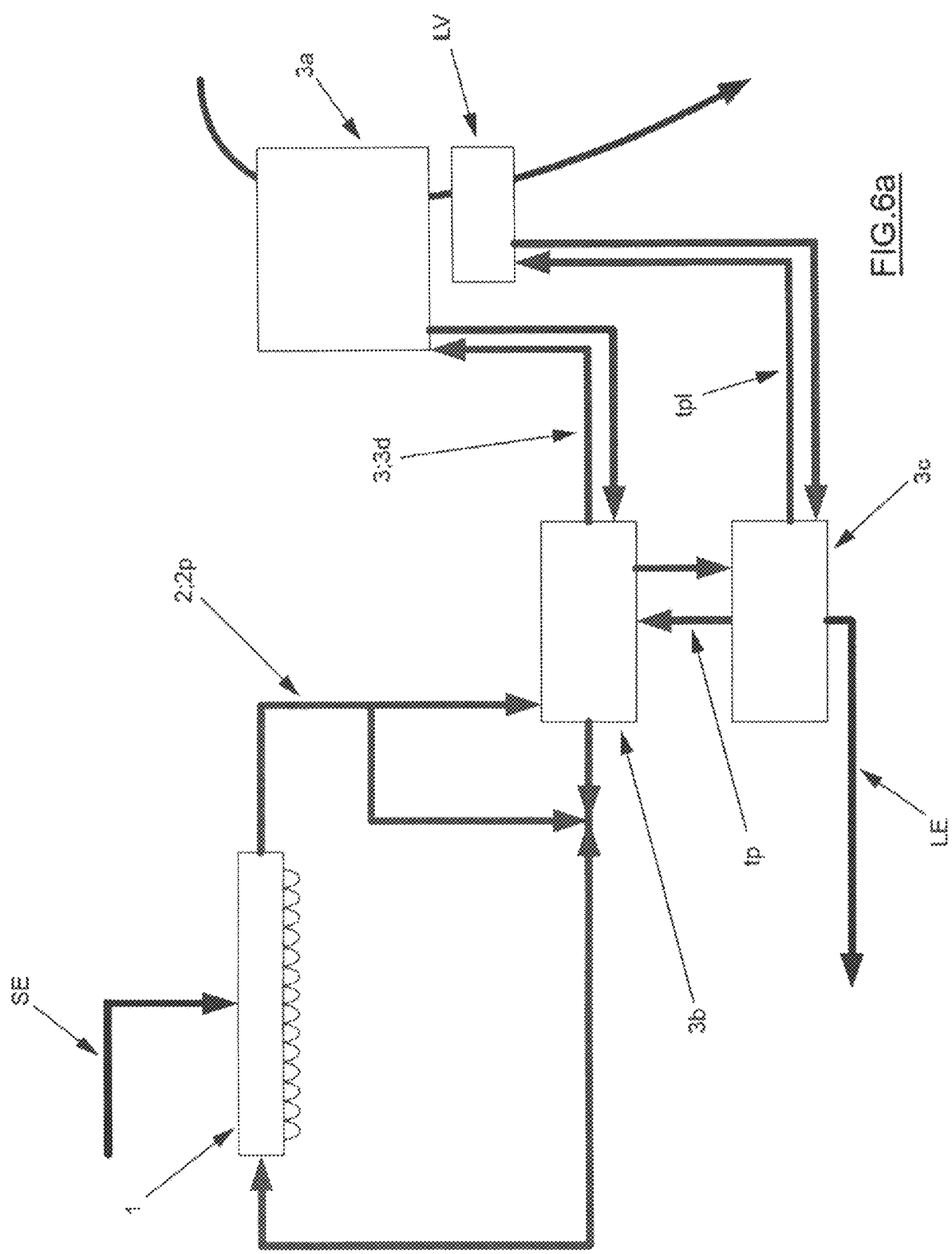

APPARATUS FOR CONTROLLING CONDITIONS IN A PLANT CULTIVATION FACILITY

CROSS-REFERENCE TO PRIOR APPLICATIONS

This application is a continuation-in-part of and claims the benefit of U.S. patent application Ser. No. 16/309,232, filed on Dec. 12, 2018, which is a U.S. National Stage application of and claims the benefit of International Patent Application No. PCT/FI2017/050424, filed Jun. 8, 2017, which claims the benefit of Finnish Patent Application No. 20165491, filed Jun. 13, 2016, all of which are incorporated by reference.

The invention relates to an apparatus for controlling conditions in a plant cultivation facility as set forth in the preamble of an independent claim directed thereto.

By courtesy of a company called Lemnis Oreon there is commercially available a LED lighting fixture developed specifically for the cultivation of plants, wherein a single lighthead is integrally provided with both a LED light source and a water circulation for its cooling. Such a solution provides a high rating for the LED light source without overheating the lighting fixture.

A problem with this type of solutions is the necessity of providing the plant cultivation facility with separate mounting frames for fastening such lighting fixtures. In addition to that, the lighting fixtures must be connected each individually to a cooling water network. Therefore, the installation, acquisition and operating costs of the discussed type of solution are quite high. Furthermore, the maintenance and upkeep of such lighting fixtures is also particularly challenging because of lighting fixture-specific water connections. With this type of solution it is not possible to control conditions in a plant cultivation facility, particularly for the optimization thereof, e.g. by adjusting the cultivation facility in terms of its temperature/humidity. In this context, another problem is the large number of water connections in a cultivation facility, increasing the risk of catastrophic leaks.

Patent publication EP1933602 discloses a water circulation lighting system for growing plants, said system comprising a lighting array with water circulation arranged in connection with plants and consisting of several LED lamps operating with external power supply and provided with hydronic cooling. This solution enables cooling water heated conductively with lamp cooling to be utilized directly for example for the heating of plants or for other necessary application of heat in a greenhouse yet it is not able to provide comprehensive control over the heat and humidity building up particularly in the indoor air of a greenhouse.

Patent publication US 2016/109107 further discloses a system for controlling conditions in a horticultural facility, said system comprising: a lighting array arranged in connection with plants present in an environmentally sealable and closable cultivation facility and consisting of several electrical lighting devices; a hydronic cooling arrangement for lowering or impeding the rise of temperature in the cultivation facility, said cooling arrangement including a cooling conduit system present in connection with plants in the cultivation facility and by way of which the lighting devices included in the lighting array are adapted to be cooled with cooling water carried in the cooling conduit system by pump action; and a heat recovery arrangement for making use of the excess heat generated in the cultivation facility, said heat recovery arrangement including a heat storage system for the storing of heat recovered with the heat recovery arrangement. However, even this solution does not provide a capability of comprehensively controlling the heat and humidity building up especially in the indoor air of a greenhouse.

The apparatus according to the present invention and intended for controlling conditions in a plant cultivation facility has an objective of providing a decisive improvement regarding the foregoing problems and of thereby raising essentially the currently available state of the art. In order to attain this objective, the apparatus according to the invention is principally characterized by what is presented in the characterizing clause of an independent claim directed thereto.

Some of the most notable benefits achieved by the apparatus of the invention, intended for controlling conditions in a plant cultivation facility, include the simplicity and efficiency of its operation and technology applicable therefor, by virtue of which it is possible, in most diverse plant growing conditions and environments, to both facilitate remarkably the assembly and maintenance of a population of equipment employed at a particular time and to also optimize conditions of a plant cultivation facility by utilizing the comprehensive heat recovery by pump action from the cultivation facility's indoor climate and from the cooling fluid circulation process used in cooling, by virtue of cooling, condenser dryer and heat storage arrangements utilized in the invention in an integrated manner.

Hence, it is by virtue of the invention that there is no need e.g. for various suspension systems for lighting fixtures by utilizing, as a preferred application of the invention, a cooling manifold which is solidly secured in a cultivation facility and arranged to cool the lighting fixtures by utilizing internal cooling water circulation or external natural and/or forced convection for heat transfer, and is present in connection with plants in one or more sections side by side and/or on top of each other. Thus, the lighting system has its lamps, in a further preferred application, removably fastenable to the cooling manifold by disposing one or more lamps side by side at the same location in a longitudinal direction of the cooling conduit profile when viewed in a cross-section of the cooling conduit profile, and further a number of lamps necessary at a particular time in succession at arbitrarily selectable locations in a longitudinal direction of the cooling conduit profile. The invention enables also e.g. inexpensive commercial water cooling systems or extruded heat-conducting cooling fin profiles to be integrated with LED lighting.

By virtue of the invention it is further possible to simplify manufacturing of LED lamps for the lighting system since, as a result thereof, there is no need of providing the same with separate cooling arrangements such as e.g. a cooling liquid circulation, or systems utilizing natural or forced convection, such as heatsinks or cooling fins, or the like. By virtue of the invention, in its simplest form the lighting fixture of a lighting system may comprise a mechanical mounting frame connected integrally therewith, by means of which the lighting fixture is fastenable to a cooling manifold in a removable manner for example with a mechanical and/or magnetic coupling assembly included integrally in the mounting frame, or for example with separate coupling springs, etc. In a cooling operation of the invention, it is also possible to optimize the mutual thermal conduction between the mounting frame and the cooling manifold by virtue of a sufficiently extensive smooth cross-sectional heat conduction contact surface of the cooling manifold, which also enables the lighting fixtures to be placed at an arbitrarily selectable location in a longitudinal direction and a radial direction when viewed in the cross-section of a cooling conduit profile.

By virtue of a heat storage unit or a so-called collector, employed as a thermal storage system in an apparatus of the invention, it is possible to combine the thermal energy gathered from a condenser dryer/cooler, a separate cultivation facility cooling arrangement, such as a hydronic cooling convector, and/or an LED cooling water circulation into a single collector, which then collects the energy by raising its internal temperature by a few degrees. On the other hand, a desired collector temperature is maintained by means of a heat pump operating in a secondary circuit, whereby the energy stored in the collector is conveyed at a higher temperature to some other use, such as for example to greenhouse heating. The collected thermal energy can also be sold to an external operator for district heating.

What is essential is that the heat energy is in the form of so-called low temperature thermal energy, which is most suitable for example for drying applications or maintenance of basic heat. The low temperature thermal energy can be recovered with efficiency as high as 6 COP. The basic principle of a collector is the accumulation of (a) thermal energy derived from LEDs or hydronic convector, (b) latent thermal energy collected from a condenser dryer/cooler, (c) thermal energy collected from the indoor air of a cultivation facility by means of a condenser dryer/cooler, as well as (d) moisture or water, which is collected from the indoor air of a cultivation facility by means of a condenser dryer/cooler, and which can be recirculated back to the plants for example as irrigation water. All in all, the collector is able to gather 90-100% of energy supplied into a cultivation facility provided that the facility has been insulated for a so-called zero-energy space, enabling a recovery of all the energy as well as, in a best case scenario, practically 70-90% of irrigation water supplied into the cultivation facility.

Therefore, the invention provides a solution for the cultivation of plants, which in terms of its acquisition, installation, and operating costs is remarkably more cost-effective than those in current technology, and by means which is possible to carry out concurrently with the illumination of cultivated plants also the management of physical conditions in a cultivation facility, e.g. by making it possible for the cultivation facility to have temperature and humidity optimal from the standpoint of plants cultivated at a particular time.

Other preferred embodiments for an apparatus of the invention are presented in the dependent claims directed thereto.

Figure 2B:
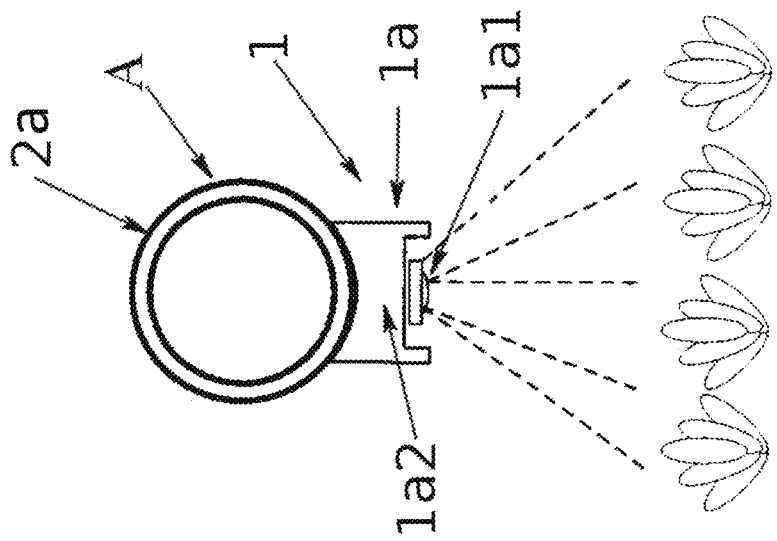
Figure 2A:
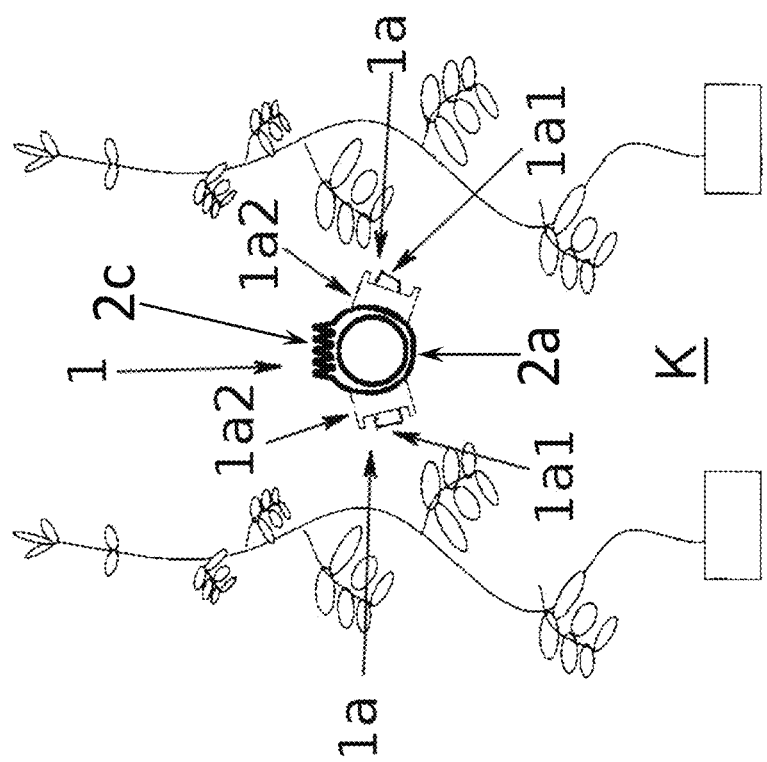
Figure 3:
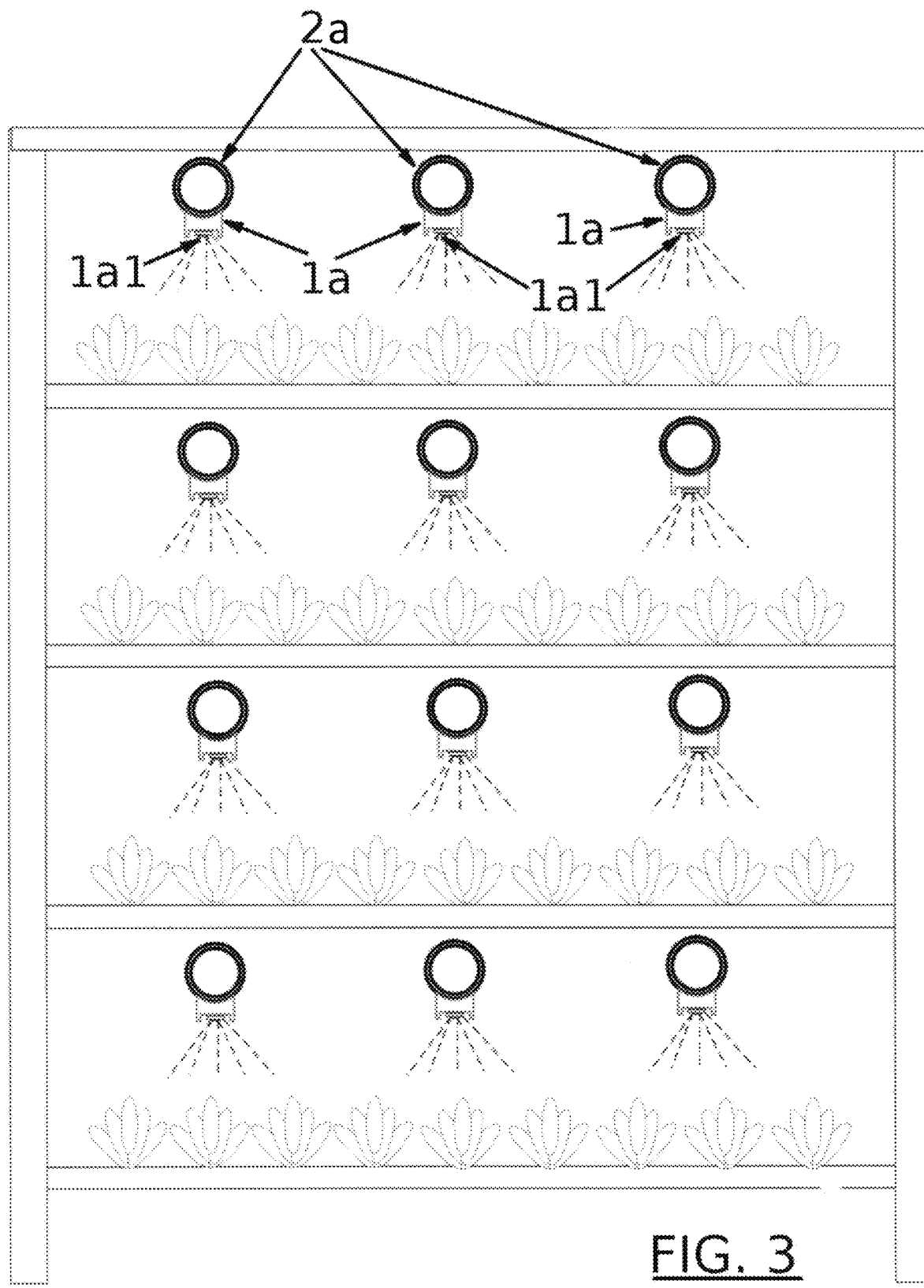
Figure 5A:
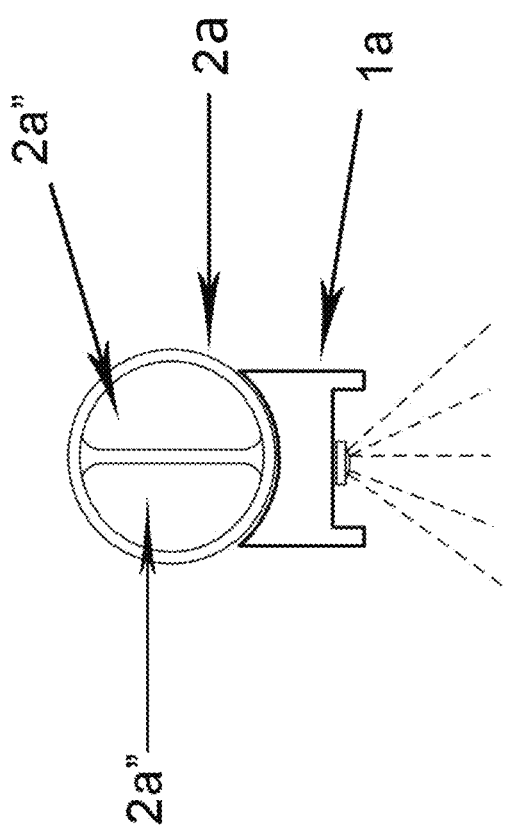
Figure 5B:
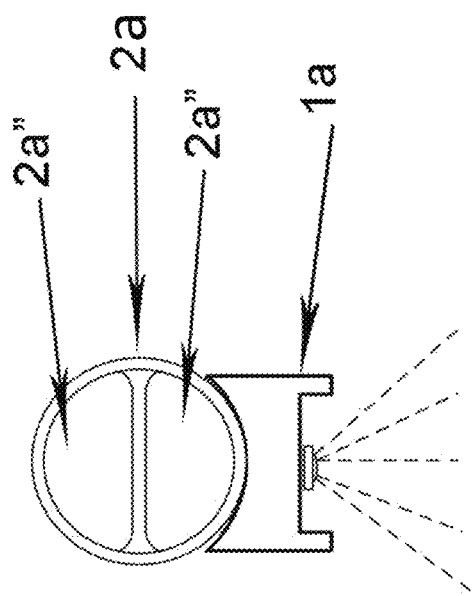
Figure 5C:
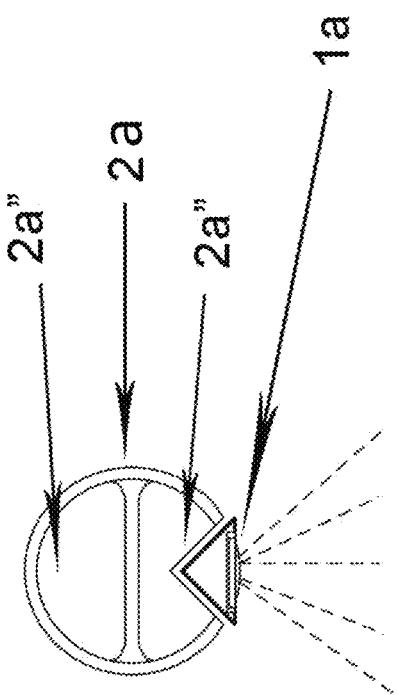
Figure 5D:
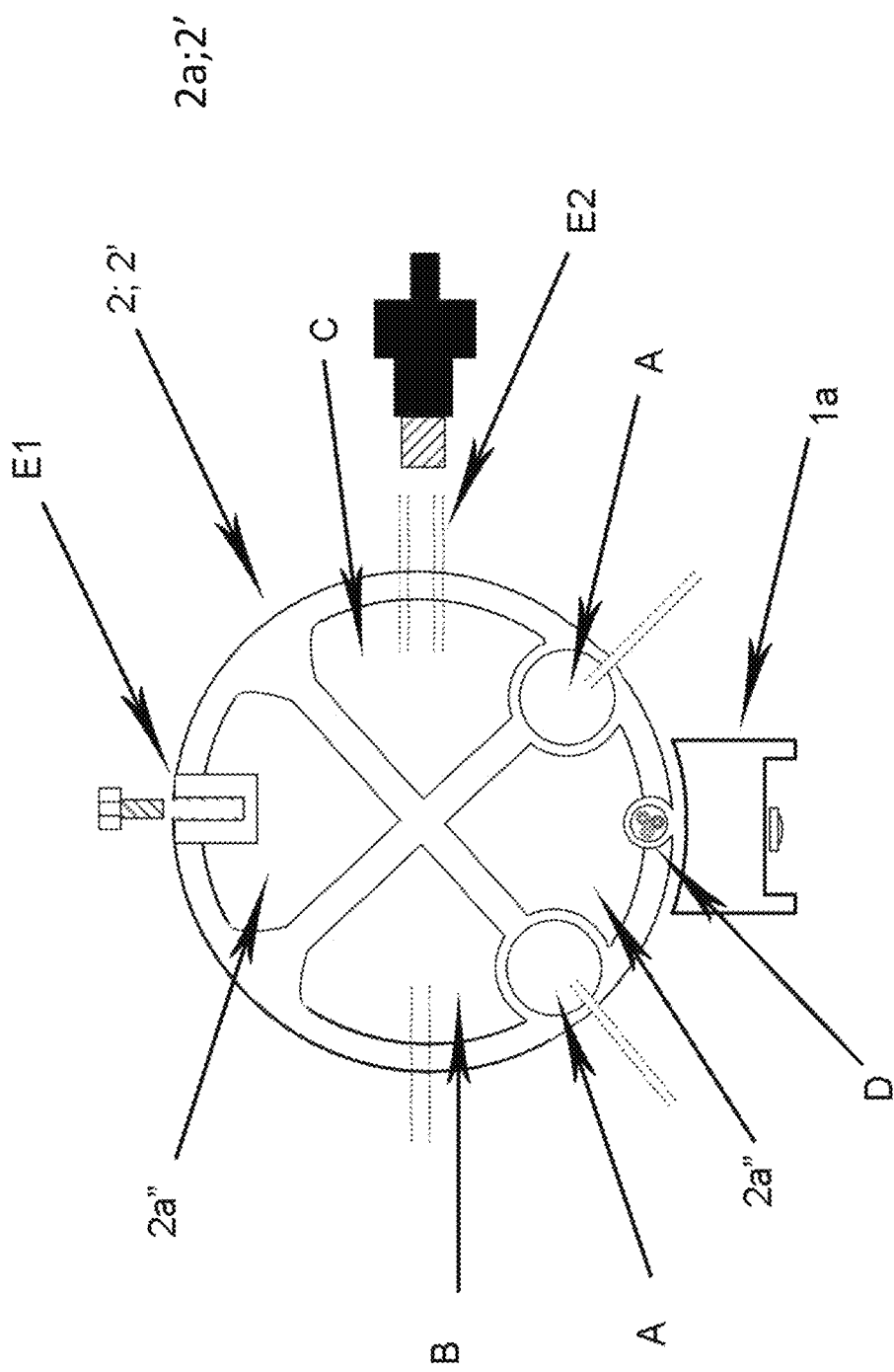
Figure 6B:
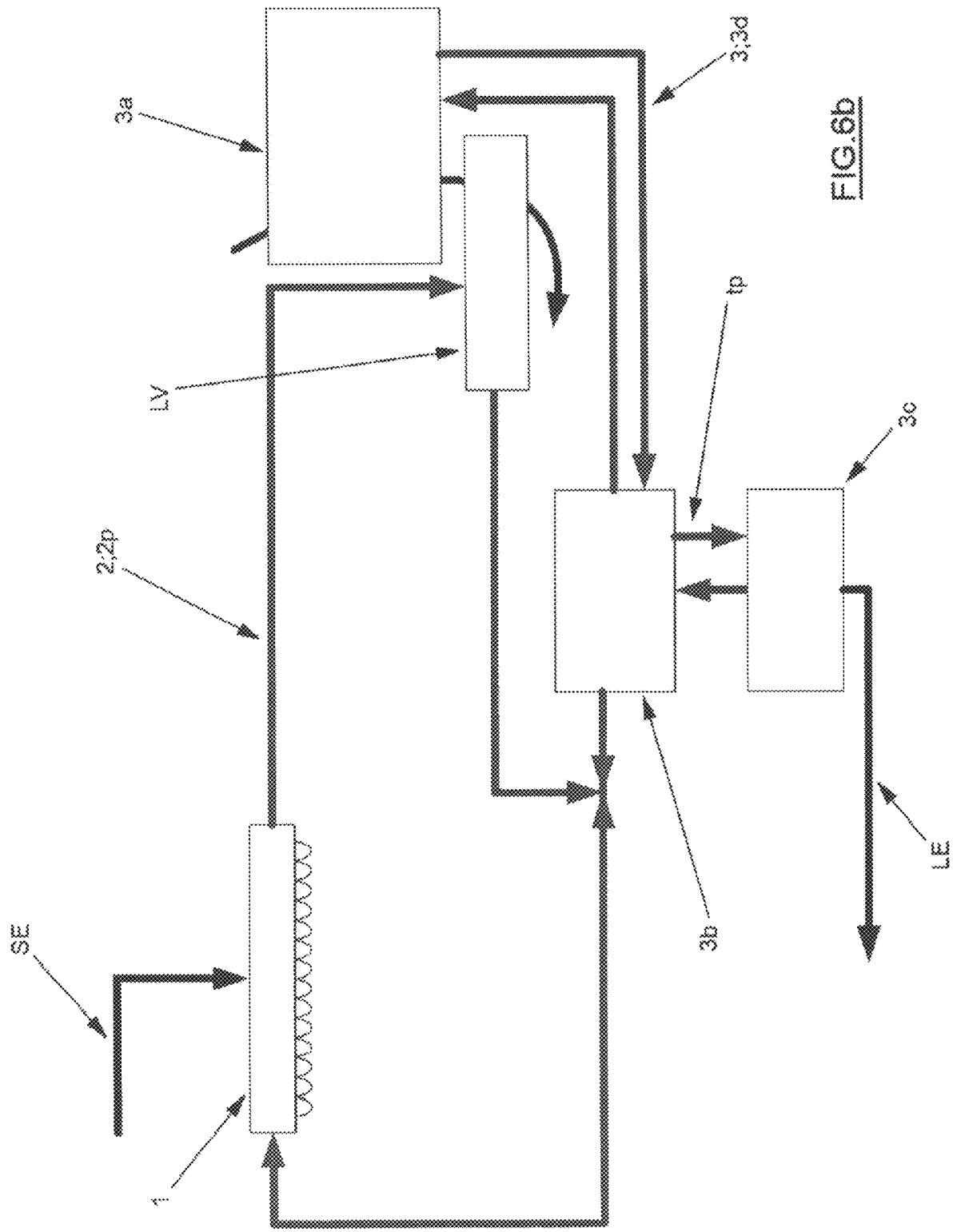

The following description shall contain a detailed review of the invention with reference to the accompanying drawings, in which FIG. 1 shows a process flowchart depicting the general operating principle for an apparatus of the invention, FIGS. 2*a* and 2*b* show a few exemplary practices for an apparatus of the invention in various plant cultivation purposes, FIG. 3 shows one preferred embodiment for an apparatus of the invention in multi-level cultivation, FIG. 4 shows two utilization options for a lighting system of the invention, especially in connection with a cooling arrangement used in multilevel cultivation, FIGS. 5*a*-5*d* further show a few preferred cooling conduit profile options employable in an apparatus of the invention, and FIGS. 6*a* and 6*b* further show by way of example two liquid circulation process options capable of being utilized in an apparatus of the invention.

The invention relates to an apparatus for controlling conditions in a plant cultivation facility, said apparatus comprising at least: a lighting system 1 arranged in connection with plants present in an environmentally sealable and closable cultivation facility K and consisting of several electrical lighting fixtures 1*a* operating most preferably with external power supply and comprising one or more electrical components 1*a* providing a lighting function; a hydronic cooling arrangement 2 for lowering or impeding the rise of temperature in the cultivation facility, said cooling arrangement comprising a cooling manifold 2 present in connection with plants in the cultivation facility K and by means of which the lighting fixtures included in the lighting system are adapted to be cooled with cooling water conducted in the manifold by pump P1; and a heat recovery arrangement for utilizing excess heat, such as that transferred into the cooling arrangement's circulation water, said heat recovery arrangement including a heat storing system 3*b* such as a water tank, a heat storage unit and/or the like for storing the heat reclaimed by the heat recovery arrangement 3. The heat recovery arrangement 3 includes one or more condenser dryers/coolers 3*a* for collecting water and/or heat absorbed in the indoor air of a cultivation facility and a heat pump assembly 3*c* for transferring the heat, accumulated in the heat storing system 3*b* by way of the cooling arrangement's circulation water 2:2*p* and/or the condenser dryer/cooler assembly's circulation water 3:3*d*, into a secondary circuit tp independent with respect to its one or more water circulation loops 2*p*, 3*d*.

What is conductively recovered from the thermal energy of especially LED lamps is typically about 45-50%, the rest consisting of radiation applied as luminous energy to the cultivation facility and plants. Moreover, the light falling on structures, i.e. bypassing the plants, transforms into airborne thermal energy. The plants, on the other hand, absorb 95% of the luminous energy falling thereon, evaporating it as moisture into the air of a cultivation facility, the remaining 5% being retained in a plant as chemical energy.

Condenser dryers or air cooling equipment are commonly implemented by using solutions, wherein the condensing surface comprises e.g. a solid heat transfer surface (typically an aluminum sheet) and/or a liquid heat transfer surface such as e.g. for example a water spray, whereby humidity condenses on the aluminum sheet surface cooler than the dew point of a greenhouse or into the water sprayed in the system. The condenser dryer/cooler collects moisture and thermal energy from the air, the latter having absorbed therein as so-called latent heat.

What is recovered from the radiation energy of LED lamps in condensation drying is typically about 45-50% since all the radiation energy accumulates in the cultivation facility either as a rise of air temperature or as humidity. Condensation drying enables a recovery of both forms of energy.

In reference to the exemplary process flowchart for an apparatus of the invention shown in FIG. 1 as a preferred embodiment, its heat pump assembly 3*c* comprises one or more water-to-water heat pump or the like included in a pump-operated P3 secondary circuit tp.

FIGS. 6*a* and 6*b* illustrate by way of example two process options which are alternative to complementary to what is shown in FIG. 1, and in which is utilized preheating of the outlet air of a condenser dryer/cooler 3*a*. In the process of FIG. 6*a*, the outlet air is preheated with a heat exchanger LV e.g. by using circulation water tpl of the secondary circuit tp of the water-to-water heat pump $3c$ conducted therein and being at a higher temperature. This makes it possible to provide a highly cost-effective system, by virtue of which it is possible that the performance of a condenser dryer/cooler be radically enhanced by lowering its process temperature. In the process of FIG. $6b$, on the other hand, the outlet air is preheated with a heat exchanger LV by means of circulation water $2p$ conducted therein from a return side of the cooling arrangement 2. In practice, this embodiment requires that the lighting system's 1 leds be operated at a temperature hotter than in the foregoing alternatives, but it simplifies decisively the flow connections of a water-to-water heat pump $3c$. In FIGS. $6a$ and $6b$, the reference symbol SE represents electrical energy and the reference symbol LE refers to thermal energy.

In reference to the aforesaid process flowcharts, the electrical components $1a1$, such as LEDs or the like, of the lighting devices $1a$ included in the lighting system are adapted to be cooled with circulation water conducted by pump P1 from a supply side $2s$ of the cooling pipework 2, whereby the circulation water of the cooling arrangement 2 and the condenser dryer's/cooler's heat transfer circuits $2p$, $3d$, coupled to the heat storing system $3b$, is adapted to be cooled by feeding it into the heat pump assembly $3c$.

The invention enables an essentially comprehensive control over the temperature and humidity of the indoor air in cultivation facility for plants, in addition to which it is also possible to utilize the invention e.g. by holding the water circulation lower than the air temperature and thereby collecting both airborne thermal energy and moisture in addition to a direct cooling of the lighting fixtures.

The apparatus according to the invention lends itself particularly well to being used especially in multilevel cultivation with cultivation conveyor systems on top of each other as depicted for example in FIG. 3. Thus, the plants are potted for example in trays at a first end of the conveyor system, migrating therefrom by the action of pressure medium operated or electrically powered actuators to a second end of the conveyor system with the plants growing to a harvesting age while proceeding in the cultivation conveyor system from first end to second end. At the second end, the plants are collected and cut/packed for sale. There is also a variation of the system, wherein the plants travel to a second end, proceed automatically onto a higher or lower level, and return therealong to a "working end". In particular, the multi-level conveyor system enables a process type and fully automated vegetable production.

Particularly in reference to the aforesaid multi-level cultivation, FIG. 4 shows two optional cultivation conveyor systems for multi-level cultivation in overhead views, of which the one on the left shows a lighting system for an apparatus of the invention as it is utilized in connection with a cooling manifold of cooling fluid, i.e. in practice most preferably water, arranged transversely relative to a longitudinal direction Ks of the cultivation facility K, and respectively the right-hand portion of FIG. 4 shows the same in connection with a cooling manifold extending in a longitudinal direction Ks of the cultivation facility K.

The cooling manifold 2 of an apparatus, utilized specifically in this context, consists of a heat conductive cooling conduit or profile, manufactured from a plastic, metallic and/or magnetic material, extending among the plants in the cultivation facility K substantially continuously with a constant cross-section, for cooling at least the light-producing components $1a1$ of lighting fixtures because of heat generated thereby while producing the light, whereby the cooling manifold has its supply side and return side connected, as shown in a preferred embodiment of FIG. 1, with the heat storing system $3b$ of a heat recovery arrangement.

In this context, the cooling manifold extending in a substantially continuous manner with a constant cross-section refers to the fact that its cross-section remains constant among successive plants, i.e. the cooling manifold is not extended individually and separately to each lighting fixture.

The foregoing type of cooling manifold 2 is particularly beneficial in enabling the cultivation facility K to be equipped, as shown in FIG. 4, with a unilateral maintenance zone H with a possibility of disposing therein the cooling system's manifolds as well as other operating, regulating and electrical engineering features related to the management of a cultivation facility. Such an implementation liberates the outer sides/ends of a cultivation conveyor system as cooling water returns from the end of each cooling conduit back to its inlet end by way of a second flow passage $2a''$. In the right-hand example of FIG. 4, the cooling water is supplied by way of a supply conduit $2a$ extended to a middle part of the cultivation facility K.

Further, the heat pump assembly $3c$, such as one or more water-to-water heat pump or the like, included as a preferred embodiment in the heat recovery arrangement 3 of the apparatus, is adapted to pass heat, stored in the circulation water delivered thereto from the heat storing system $3b$ by pump action P3, to a secondary circuit tp which is separate with respect to the cooling and condensation water circulation. At this point, it is further possible to implement the heat storing system by having it provided with sections of warm circulation water and cold circulation water which are partly or fully insulated relative to each other.

In a further preferred embodiment for an apparatus of the invention, the lighting fixture $1a$ of a lighting system included therein comprises a coupling system included integrally in or being separate with respect to its frame for coupling the lighting fixture, e.g. in reference to FIGS. $2a$, $2b$, 3 and $5a$-$5d$, to a specially designed or standard dimensional shaft, tube and/or profile used in the cooling manifold 2, at what in a longitudinal and a radial direction is an arbitrarily selected location when viewed in its cross-section.

In particular reference to the preferred embodiments shown in FIGS. $2a$, $2b$ and 3, the apparatus comprises a cooling manifold 2, solidly propped in the plant cultivation facility K and present among the plants in one or more sections side by side and/or on top of each other, to which the lighting system's lighting fixtures $1a$ are fastened permanently or removably mechanically and/or magnetically.

In particular reference to the preferred embodiment shown in FIG. $2a$, the apparatus according to the invention has e.g. several lighting fixtures $1a$ disposed on the outer surface of a cooling conduit or profile at what in a radial and in a longitudinal direction is an arbitrarily selectable location when viewed in its cross-section for pointing the lighting fixture/lighting fixtures, as necessary, downwards, sideways and/or upwards. The placement of a lighting fixture on a thermal radiation surface, i.e. on a cooling rib system $2c$, of the cooling conduit profile of FIG. $2a$ is undesirable, because in this case the mounting frame must be provided with a profile consistent with the cooling rib system $2c$. Hence, the mutual heat conduction between the cooling conduit profile and the mounting frame easily remains unsatisfactory.

FIG. $2a$ depicts how the invention is utilized when employing bilateral lighting positioned in the middle of plants, and FIG. $2b$ shows respectively its utilization in lighting for e.g. salads, herbs and flowers or in seedling lighting when using conventional overhead lighting. In addition, the embodiment shown in FIG. 2a has been implemented so as to enable hybrid functionality by using a cooling conduit profile provided with the cooling rib system 2c. Thereby is facilitated the carrying out of cooling for lighting fixtures by means of a cooling conduit profile, as necessary, in a so-called passive manner, i.e. by making use of natural convection, or, in addition to that, also internally of the cooling conduit profile in a so-called active manner, i.e. by making use of forced convection, with the use of an appropriate circulation of cooling fluid, air or other medium. In addition, the hybrid structure enables also the collection of other process heat out of the cultivation facility by cooling the ambient air by means of the cooling conduit profile's ribbing 2c.

In an embodiment of the invention, the cooling arrangement's cooling manifold is arranged inside of one or more separate cooling apparatus, such as cooling convector, wherein the cooling fluid is circulating in the manifold internal to the apparatus. In connection with cooling convector's internal fan and metallic thermal transfer plates, the cooling manifold enables cooling of the cultivation facility, wherein the cooling of the lighting fixtures is realized by air convection.

In another embodiment of the invention, the cooling manifold structure is arranged to utilize natural or forced air convection for cooling the lighting fixtures attached on it. The cooling conduit is preferably manufactured from thermally conductive material, such as metal, and has a cross-sectional profile that optimizes the surface area of the conduit for convective heat transfer, i.e. a cooling fin shape, to provide adequate heat transfer from the lighting fixtures for their cooling. In this context, the convective heat transfer consequently increases the air temperature of the cultivation facility, wherein one or more separate hydronic cooling convectors with internal cooling fluid circulation are used to cool the facility and collect the thermal energy generated by the lighting fixtures and utilized in the heat storing system 3; 3b.

In a further preferred embodiment of the invention, in reference to FIG. 1, the condenser dryer/cooler 3a, suppliable by pump P2 with circulation water conducted from the heat storing system 3; 3b of a heat recovery arrangement included in the apparatus, is connected from its collection space, which contains condensation water and cooling water, the former having been condensated thereby from the cultivation facility's indoor air, with a connecting pipe 3d to the heat storing system 3b for conveying the circulation water and heat, accumulated in the collection space, into the heat storing system 3b.

In reference to what is depicted in FIGS. 5a-5d as a preferred embodiment for the apparatus of the invention, its cooling manifold 2 consists of a conduit profile 2', comprising in a single cross-section at least two flow passages 2a'', one passage being where occurs an inlet flow proceeding from a cooling water supply side 2s and the other with a return flow proceeding to a return side 2p. In this context, especially for the condenser dryer/cooler 3a, the cooling manifold 2 has its conduit profile 2' provided with a single- or multi-compartment vacuum space A for absorbing therein the water condensated on the conduit profile's surface.

Especially in the implementations of FIGS. 5b and 5c, the upper flow passage 2a'' is at a cooler temperature. Because the free convection is most intensive from a top surface of the conduit, this arrangement makes it possible to minimize heat transfer taking place directly from the cooling conduit to ambient air. Especially in the implementation of FIG. 5c, both the lighting fixture frame and the conduit's lower flow passage have been optimized in such a way that this particular implementation minimizes heat transfer to air and maximizes heat transfer to cooling water circulation. In the implementation of FIG. 5a, the premise is, on the other hand, that the cooling conduit is over its entire length at a highly consistent temperature whereby it is not possible for the cultivation facility to develop undesired major temperature discrepancies or excessive condensation.

In this context, referring to FIG. 5d as a further preferred embodiment, the cooling manifold's conduit profile 2; 2' comprises, in reference to a so-called infrastructural profile depicted in FIG. 5d, a single or multi-compartment vacuum space A for absorbing therein the water condensated on the conduit profile's surface, a carbon dioxide pressure dispensing chamber B, a mist irrigation dispensing chamber C and/or a single- or multi-compartment interior, a surface groove D or the like for the wirings of lighting fixtures or the like purpose.

In further reference to a preferred conduit profile 2' depicted in FIG. 5d, it has been provided with a coupling arrangement E1 for securing it to the cultivation facility K and/or with a coupling arrangement E2 for fastening thereto an implement, such as a mist nozzle or the like, intended for the irrigation of plants.

The lighting system utilized in an apparatus of the invention comprises, as a further per se conventional embodiment, adjustment automation for adjusting the operating temperature of the lighting system's lighting fixtures 1a and/or the temperature/humidity of a plant cultivation facility e.g. by controlling the temperature and/or flow rate of a circulation fluid proceeding by way of a cooling arrangement and/or a condenser dryer/cooler. The operating chart depicted in FIG. 1 further shows a three-way valve 3T, which enables the adjustment of circulation water temperature as desired at a particular time by mixing with each other the return flow 2p of a cooling conduit and the circulation water of a heat storing system 3b. The discussed chart further shows a flow fitting 7 for the adjustment of water in the cooling water circulation process of the apparatus, such as e.g. in view of increasing moisture in the cultivation facility. In addition, the chart shows with the reference symbol FW a flow fitting for passing accumulated water into the cultivation facility for example as irrigation water.

It is obvious that the invention is not limited to the above-presented or -described embodiments, but it can be subjected within the basic concept of the invention to a multitude of modifications, depending e.g. on the lighting conditions for and special requirements of plants to be cultivated at a particular time, whereby e.g. the employable condenser dryer/cooler may represent the air drying technology best suitable for each particular purpose. In addition to or instead of LED lamps, it is naturally possible to carry out the invention by utilizing most diverse light producing techniques with notable examples thereof including: laser, OLEC, LEC lamps, quantum dots, plasma, halogen and induction lamps.

E.g. plasma lamps are based on an argon or sulphur core, which is incandesced with microwaves and which upon heating glows light similar to the sun.

Further particularly incandescent lamps, induction lamps and halogen lamps are based on the same phenomenon, and all these are even at present used also as plant growing lights.

In LEC (Light Emitting Capacitor) technology, the fluorescent insulating material begins to glow in an electric field, said technology being applied e.g. in the backlighting of display screens. OLED, LEC, LED and quantum dot technologies are all based on the electroluminescence phenomenon. Other relevant notable light sources further include discharge lamps, such as Xenon, HPS, MH, as well as fluorescent tubes.

The invention claimed is:

1. An apparatus for controlling conditions in an indoor plant cultivation facility, said apparatus comprising:
   a lighting system comprising:
      an array of two or more electrical lighting fixtures; and
      one or more electrical components providing a lighting function, wherein the one or more electrical components are included in each of said electrical lighting fixtures;
      a cooling conduit profile on which said electrical lighting fixtures are attached;
      a cooling rib system arranged on the cooling conduit profile for cooling the electrical lighting fixtures;
   a hydronic cooling arrangement for lowering or impeding the rise of temperature in the indoor plant cultivation facility, said hydronic cooling arrangement comprising:
      a first pump; and
      a cooling manifold providing a first circulation loop, and configured to be installed in the indoor plant cultivation facility wherein the cooling manifold is configured to cool the indoor plant cultivation facility with cooling water circulated in the first circulation loop by the first pump; and
   a heat recovery arrangement for utilizing excess heat in the indoor plant cultivation facility, said heat recovery arrangement comprising:
      one or more condenser dryers/coolers for collecting water and/or heat absorbed in an indoor air of the indoor plant cultivation facility;
      a second circulation loop connecting the one or more condenser dryers/coolers to a heat storing system for circulating circulation water;
      a heat storing system for storing the excess heat reclaimed by the heat recovery arrangement, which is accumulated in the cooling water circulated in the first circulation loop of the hydronic cooling arrangement and/or the circulation water circulated in the second circulation loop;
      a secondary circuit for circulating circulation water, which is independent with respect to the first circulation loop and/or the second circulation loop; and
      a heat pump assembly coupled to the heat storing system and the secondary circuit for transferring the heat from the heat storing system into the secondary circuit.

2. The apparatus according to claim 1, wherein each of the condenser dryer/cooler comprises a heat exchanger for heating outlet air of the condenser dryer/cooler, with circulation water being circulated from the secondary circuit into the heat exchanger by the heat pump assembly and/or from a return side of the first circulation loop of the hydronic cooling arrangement.

3. The apparatus according to claim 1, wherein the heat pump assembly comprises one or more water-to-water heat pumps.

4. The apparatus according to claim 1, characterized in that the cooling arrangement's cooling manifold comprises a heat conductive cooling conduit or profile, manufactured from a plastic, metallic and/or magnetic material, configured to cool the indoor plant cultivation facility because of heat generated by light-producing components while producing the light, whereby the cooling manifold has a supply side and a return side connected to the heat storing system of the heat recovery arrangement.

5. The apparatus according to claim 1, wherein the one or more condenser dryers/coolers, are supplied via the second circulation loop by a second pump with the circulation water being conducted from the heat storing system of the heat recovery arrangement, the one or more condenser dryers/coolers further comprise a collection space containing condensation water and cooling water, the former having condensed therein from the indoor cultivation facility's indoor air, and a connecting pipe coupled to the heat storing system for conveying the circulation water and heat accumulated in the collection space, into the heat storing system.

* * * * *